United States Patent
Marioni

(10) Patent No.: US 6,811,426 B2
(45) Date of Patent: Nov. 2, 2004

(54) COUPLING SYSTEM BETWEEN AN ELECTRIC MOTOR AND A JUNCTION BOX

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 168 days.

(21) Appl. No.: 10/292,458

(22) Filed: Nov. 13, 2002

(65) Prior Publication Data

US 2003/0099072 A1 May 29, 2003

(30) Foreign Application Priority Data

Nov. 22, 2001 (IT) .................................... PD2001A0272

(51) Int. Cl.$^7$ ............................................ H01R 13/64
(52) U.S. Cl. ..................................... 439/374; 439/929
(58) Field of Search ............................... 439/374, 929, 439/736, 283; 417/423.14; 415/200

(56) References Cited

U.S. PATENT DOCUMENTS

| | | | | |
|---|---|---|---|---|
| 2,791,461 A | * | 5/1957 | Goldenberg ................. | 294/85 |
| 4,939,622 A | * | 7/1990 | Weiss et al. ................. | 439/374 |
| 4,996,628 A | * | 2/1991 | Harvey et al. .............. | 439/929 |
| 5,823,815 A | * | 10/1998 | Takata ........................ | 439/374 |
| 5,876,224 A | * | 3/1999 | Chadbourne ................ | 439/110 |
| 6,116,932 A | * | 9/2000 | Kawakita .................... | 439/374 |
| 6,142,813 A | * | 11/2000 | Cummings et al. ......... | 439/374 |
| 6,190,194 B1 | * | 2/2001 | Kubota ........................ | 439/929 |
| 6,227,802 B1 | * | 5/2001 | Torgerson et al. ........ | 415/199.2 |

* cited by examiner

Primary Examiner—P. Austin Bradley
Assistant Examiner—Briggitte R. Hammond
(74) Attorney, Agent, or Firm—Akerman Senterfir

(57) ABSTRACT

A coupling system between a set of components to be mutually assembled comprising a box-like body that contains an electric motor, a corresponding head and a junction box that contains the elements for electrical connection, comprising a first protrusion that protrudes from an axial wall arranged at the bottom of the box-like body and provided with a first opening in which the axial electrical connectors for the motor are arranged. The junction box is engaged slidingly, upon assembly, in the wall and encounters a first retention element constituted by the first protrusion and a second retention element constituted by the head. The junction box is provided with connection elements that are connected to an internal terminal strip and are aligned so as to match and couple the electrical connectors.

15 Claims, 3 Drawing Sheets

COUPLING SYSTEM BETWEEN AN ELECTRIC MOTOR AND A JUNCTION BOX

BACKGROUND OF THE INVENTION

The present invention relates to a coupling system between an electric motor and a junction box.

Centrifugal electric pumps are known in the art which comprise components that are fixed reversibly, and more specifically a box-like body, containing the electric motor, with which a head is to be associated, said head forming, for example, the volute of the centrifugal pump and containing the hydraulic components, and an electrical junction box, in which the user provides the electrical connection by means of a terminal strip arranged inside it.

The box-like body and the junction box must be coupled so as to ensure both effective protection against water and/or dust infiltrations and safe connection between the terminal strip and the windings of the motor.

Currently, the windings of the motor are connected to the terminal strip by means of simple cables or rigid contacts, while the physical coupling between the box-like body and the junction box is provided by means of screws, with the interposition of perimetric sealing gaskets that ensure tightness against infiltrations.

From the above description it is evident that it is functionally difficult to mate the junction box to the box-like body, owing to the presence of fixing screws that slow this operation.

Furthermore, an incorrect assembly of the two elements may entail an unreliable seal against infiltrations of liquids.

SUMMARY OF THE INVENTION

The aim of the present invention is to solve or substantially reduce the problems of known types of coupling between box-like bodies that contain electric motors and electrical junction boxes.

Within this aim, an object is to provide a coupling between an electric motor and a junction box that can be produced rapidly and without using screws.

Another object is to provide a coupling that ensures tightness against water and dust infiltrations and safe connection between the terminal strip and the windings of the motor.

Another object is to provide a coupling constituted by a reduced number of components.

This aim and these and other objects that will become better apparent hereinafter are achieved by a coupling system between an electric motor and a junction box on a set of components to be mutually assembled and comprising a box-like body that contains an electric motor, a corresponding head and a junction box that contains the elements for electrical connection, characterized in that a first protrusion protrudes from an axially arranged wall of the bottom of said box-like body and is provided with a first opening in which the axial electrical connectors for said motor are arranged, said junction box being engaged slidingly in said wall and encountering, when said set of components is assembled, a first retention element constituted by said first protrusion and a second retention element constituted by said head, said junction box being provided with connection elements that are connected to an internal terminal strip and are aligned so as to match said electrical connectors, in order to couple to them.

BRIEF DESCRIPTION OF THE DRAWINGS

Further characteristics and advantages of the invention will become better apparent from the description of a preferred but not exclusive embodiment thereof, illustrated only by way of non-limitative example in the accompanying drawings, wherein.

DESCRIPTION OF THE PREFERRED EMBODIMENTS

Figure 1:
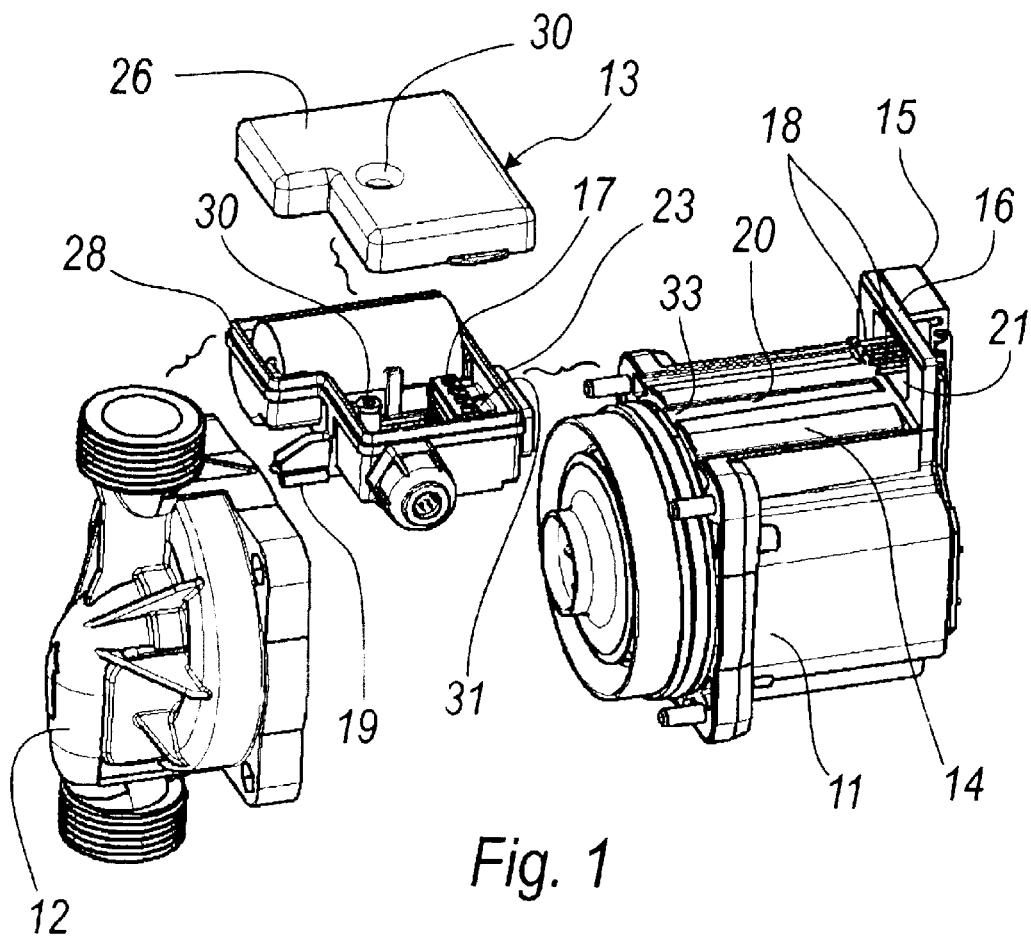
FIG. 1 is an exploded view of an assembly constituted by a centrifugal pump, an electric motor and a junction box with a coupling according to the invention.
Figure 2:
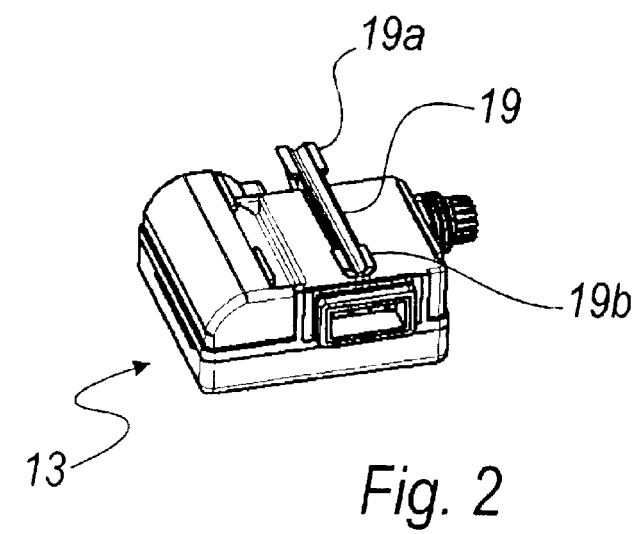
FIG. 2 is a view of the junction box of FIG. 1.
Figure 3:
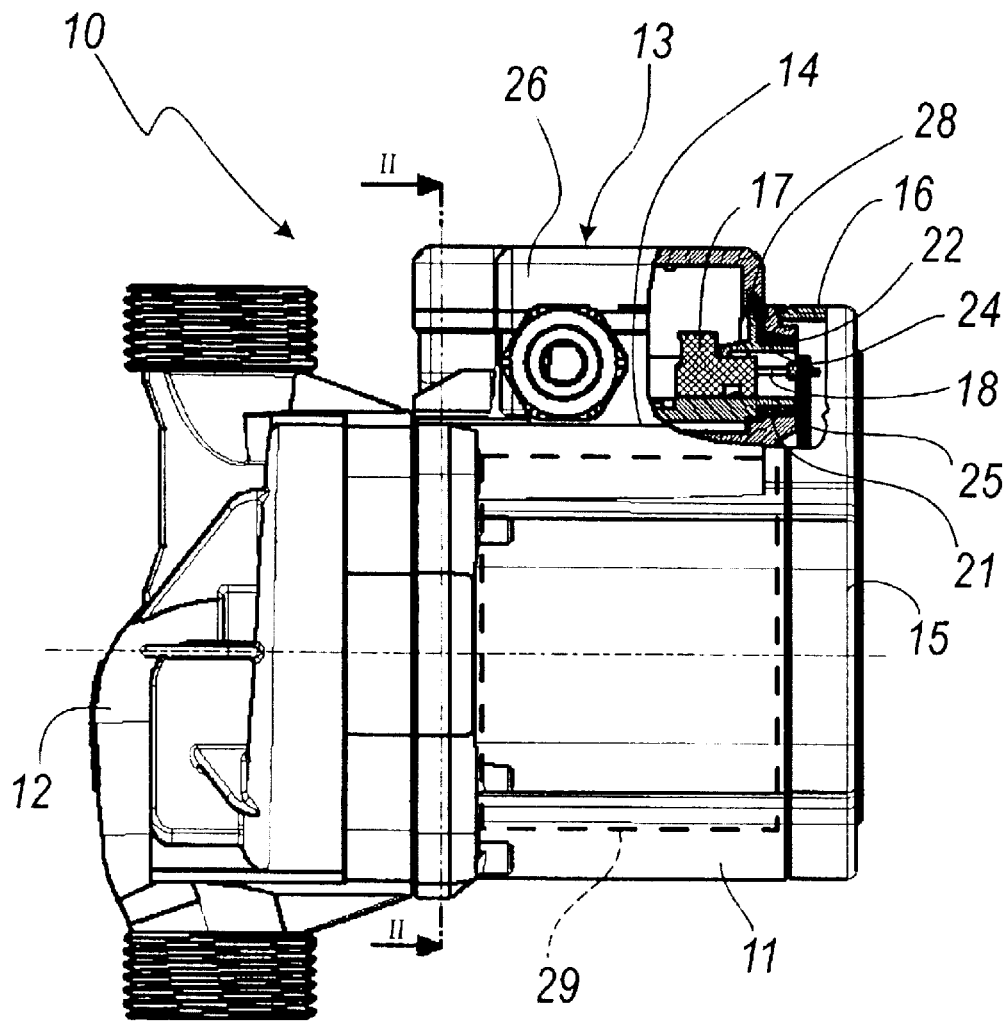
FIGS. 3 and 4 are two different partially sectional views of the assembly of FIG. 1.
Figure 4:
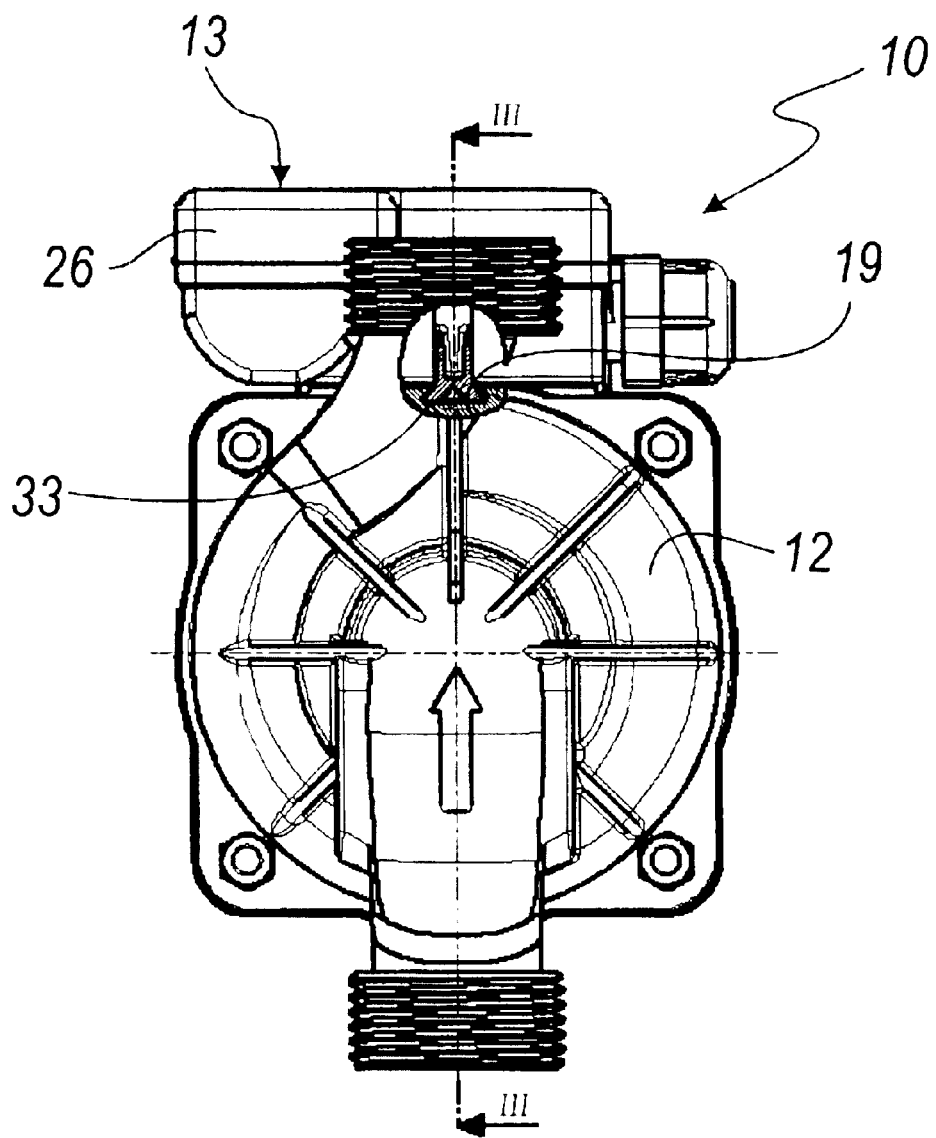

With reference to the figures, a coupling between an electric motor and a junction box, according to the invention, is generally designated by the reference numeral 10.

The coupling system 10 is applied to a set of components to be assembled, which in this case constitutes a centrifugal electric pump that comprises a box-like body 11, which contains the electric motor 29 and to which a head 12 is to be fixed, said head forming, in the case shown in the no figure, the volute of the pump and containing the hydraulic components, and a junction box 13, which contains the elements for electrical connection.

A first protrusion 16 protrudes at right angles from an axially arranged wall 14 of the box-like body 11, at its bottom 15, and is provided with a first opening 21 in which the electrical connectors 18 for connection to the windings of the electric motor 29 are arranged, as described better hereinafter.

The junction box 13 engages slidingly on the wall 14 and, once assembled, encounters a first retention element constituted by the first protrusion 16 and, as shown hereinafter, a second retention element constituted by the head 12.

Inside the junction box 13 there is a terminal strip 17, which is connected to the electric connectors 18 when the box-like body 11 and said junction box 13 are assembled.

Said sliding coupling provides for the protrusion from the junction box 13, on the part that is meant to face the box-like body 11, of a second axial protrusion 19 that comprises two spaced portions 19a and 19b that have dovetail ends, for engagement in a complementarily shaped axial sliding guide 20 formed on the wall 14 of the box-like body 11.

Advantageously, the dovetail shape can run along the entire length of the junction box 13.

In particular, the sliding guide 20 is formed on the wall portion 14 starting from the region where the head 12 is fixed, in which the end 33 is open to allow the insertion of the second protrusion 19.

In this manner, once the second protrusion 19 is engaged in the sliding guide 20 and the head 12 is assembled to the box-like body 11, it is no longer possible to remove the junction box 13 from its seat, because the second protrusion 19 encounters a retention element constituted by said head 12.

The first protrusion 16 is provided, as mentioned, with a first opening 21 within which a perimetric collar 23 engages hermetically when the junction box 13 is coupled to the box-like body 11; said collar protrudes from a second opening 24 of the junction box 13, which accommodates internally the sockets 31 for the connectors 18, which are connected to the internal terminal strip 17.

A first gasket 22 is arranged perimetrically to the collar 23 and forms a seal with the edge that forms the first opening 21.

Advantageously, the first gasket 22 can be co-molded with the perimetric collar 23.

The electrical connectors 18 are rigid contacts of the pin type, which protrude from an electronic board 25 that powers the electric motor 29 and is arranged, with one of its portions, below the first protrusion 16, within the bottom 15 of the box-like body 11.

The junction box 13 is provided with a cover 26 that can be opened and is associated with reversible fixing means in order to allow the user to access the terminal strip 17.

The cover 26 is provided perimetrically with a second sealing gasket 28, which is advantageously monolithic with the first gasket 22.

The reversible fixing means are constituted, in this case, by a screw that is not shown for the sake of simplicity and engages on a corresponding seat 30.

As regards operation, before fixing the head 12 to the box-like body 11 it is necessary to fit the junction box 13, making sure that the second protrusion 19 engages on the sliding guide 20, inserting it through its open end 33.

When the second protrusion 19 engages the sliding guide 20, the sockets 31 are perfectly aligned with the electrical connectors 18, and by sliding the junction box 13 to the end of its stroke the collar 23 enters the first opening 21 of the first protrusion 16, while the electrical connectors 18 engage in the sockets 31 connected to the terminal strip 17.

The locking of the junction box 13 is ensured by the fixing of the head 12 onto the box-like body 11, which closes the open end 33 of the guide 20.

It is evident that protection against infiltrations is ensured by means of the first gasket 22, which is co-molded perimetrically with the collar 23.

In practice it has been found that the present invention has achieved the intended aim and objects.

A coupling between an electric motor and a junction box has in fact been provided which occurs in a rapid and simple manner without using screws.

The present invention is susceptible of numerous modifications and variations, all of which are within the scope of the appended claims.

All the technical details may further be replaced with other technically equivalent elements.

The materials, so long as they are compatible with the contingent use, as well as the dimensions, may be any according to requirements.

The disclosures in Italian Patent Application No. PD2001A000272 from which this application claims priority are incorporated herein by reference.

What is claimed is:

1. A coupling system providing connection between components of a set of components to be mutually assembled, the set comprising a body that contains an electric motor with axial electrical connectors, a corresponding head and a junction box that contains electrical connection elements for electrical connection, the system comprising: a first protrusion constituting a first retention element, and which protrudes from an axial wall arranged at a bottom part of said body, said first protrusion being provided with a first opening in which the axial electrical connectors of said motor are arranged, said junction box being engaged slidingly in said wall and encountering, when said set of components is assembled, said first retention elements; and a second retention element constituted by said head, and wherein said junction box is provided with an internal terminal strip and with the electrical connection elements that are connected to the internal terminal strip and are aligned so as to match and couple to said electrical connectors of the motor.

2. The coupling system of claim 1, further comprising a sliding guide formed on said axial wall of said body and at least one second axial protrusion that protrudes from said junction box, on a part thereof facing said box-like body, said second axial protrusion engaging in said sliding guide which is shaped complementarily thereto.

3. The coupling system of claim 2, wherein said second protrusion has at least one portion with dovetail ends for engagement in said complementarily shaped sliding guide.

4. The coupling system of claim 2, wherein said second protrusion comprises two separate spaced portions with dovetail ends.

5. The coupling system of claim 4, wherein said second protrusion extends along said junction box, with said dovetail ends protruding therefrom.

6. The coupling system of claim 2, wherein said second protrusion is inserted within said sliding guide with said electrical connectors and said connection electrical elements connected to said terminal strip being aligned.

7. The coupling system of claim 6, wherein said sliding guide has ends that are open for allowing insertion of said second protrusion, which is arranged at a region of said junction box where said head is fixed.

8. The coupling system of claim 7, further comprising a perimetric collar, protruding from a second opening of said junction box, and in which said electrical connection elements are arranged, said first protrusion being provided with the first opening in which said perimetric collar engages when said junction box is coupled to said body.

9. The coupling system of claim 8, wherein said axial electrical connectors are rigid contacts that rise from an electronic board for powering the electric motor, the electronic board being partially arranged below said first protrusion, said rigid contacts engaging said electrical connection elements on assembly.

10. The coupling system of claim 9, wherein said electrical connection elements are sockets connected to said terminal strip.

11. The coupling system of claim 8, wherein said collar is provided perimetrically with a first sealing gasket.

12. The coupling system of claim 11, wherein said first gasket is provided co-molded perimetrically with said collar.

13. The coupling system of claim 11, wherein said junction box is provided with an openable cover, with reversible fixing means, and with a second sealing gasket that runs perimetrically thereto.

14. The coupling system of claim 13, wherein said first and second sealing gaskets are a monolithic body.

15. The coupling system of claim 13, wherein said reversible fixing means are constituted by a screw.

* * * * *